US007113641B1

(12) United States Patent
Eckes et al.

(10) Patent No.: US 7,113,641 B1
(45) Date of Patent: Sep. 26, 2006

(54) METHOD FOR RECOGNIZING OBJECTS IN DIGITIZED IMAGES

(76) Inventors: Christian Eckes, Volmestrasse 113, 58566 Kierspe (DE); Efthimia Kefalea, Goetiestrasse 33, 61462 Koenigstein (DE); Chrstoph Von Der Malsburg, Wiemelhauser Strasse 180, 44799 Bochum (DE); Michael Pötzsch, Velestrasse 112, 44803 Bochum (DE); Michael Rinne, Worderfeld 8, 44357 Dortmund (DE); Jochen Triesch, Dahlhauser Hoehe 46, 44879 Bochum (DE); Jan C. Vorbrüggen, Am Varenholt 55 A, 44797 Bochum (DE)

( * ) Notice: Subject to any disclaimer, the term of this patent is extended or adjusted under 35 U.S.C. 154(b) by 0 days.

(21) Appl. No.: 09/762,806

(22) PCT Filed: Aug. 13, 1999

(86) PCT No.: PCT/EP99/05946

§ 371 (c)(1),
(2), (4) Date: Sep. 19, 2001

(87) PCT Pub. No.: WO00/10119

PCT Pub. Date: Feb. 24, 2000

(30) Foreign Application Priority Data

Aug. 14, 1998 (DE) .......................... 198 37 004

(51) Int. Cl.
G06K 9/68 (2006.01)

(52) U.S. Cl. .................. 382/218; 345/419; 345/476; 345/619; 348/169; 382/103; 382/115; 382/180; 382/190; 382/285

(58) Field of Classification Search ................. 345/419, 345/440, 473, 619, 646; 348/77, 169; 382/103, 382/115, 118, 154, 180, 190, 209, 217, 218, 382/260, 278, 279, 285
See application file for complete search history.

(56) References Cited

U.S. PATENT DOCUMENTS

| 6,301,370 B1 | * | 10/2001 | Steffens et al. ............. 382/103 |
| 6,563,950 B1 | * | 5/2003 | Wiskott et al. ............. 382/209 |
| 6,580,811 B1 | * | 6/2003 | Maurer et al. ............. 382/103 |
| 6,580,821 B1 | * | 6/2003 | Roy ........................... 382/154 |
| 6,714,661 B1 | * | 3/2004 | Buddenmeier et al. ..... 382/103 |

FOREIGN PATENT DOCUMENTS

DE         44 06 020 C      6/1995

OTHER PUBLICATIONS

L. Wiskott et al.; "Face Recognition by Elastic Bunch Graph Matching"; *IEEE Transactions on Pattern Analysis and Machine Intelligence, US, IEEE Inc.*; vol. 19, No. 7, p 775–779, Jul. 1997.

* cited by examiner

*Primary Examiner*—Bhavesh M. Mehta
*Assistant Examiner*—Gregory Desire
(74) *Attorney, Agent, or Firm*—IP Strategies

(57) ABSTRACT

A method for automatically recognizing one or more structures in digitized image date includes determining sub-jets of the image graph at the nodes defined by its structure. The sub-jets correspond to at least part of the determined sub-jets of the specific reference graph. The projection of the net-like structure of the specific reference varies until a graph comparison function, which compares the jets of the image graph with the corresponding jets of the specific graph, becomes optimal. The structure is associated with a reference image corresponding to the reference graph for which the graph comparison function is optimal, with respect to the optimal image graph determined for the reference graph.

35 Claims, 6 Drawing Sheets

METHOD FOR RECOGNIZING OBJECTS IN DIGITIZED IMAGES

FIELD OF THE INVENTION

The present invention relates to a method for automatically recognizing one or a plurality of structures and/or one or a plurality of objects in digitized image data.

PRIOR ART

Methods for automatically recognizing an object in digitized image data are known in the prior art.

DE 44 06 020, for example, discloses a face recognition method. According to this method so-called jets are extracted from a digitized image with Gabor filters of different magnitudes and orientations, said jets being arranged at the nodes of a grid which is adapted to be subjected to displacement, scaling and deformation. This graph, i.e. the structure of the grid and the jets associated with the nodes of the grid, are compared with a reference graph comprising the structure to be recognized. For this purpose, the optimum form of the grid is determined by a two-phase optimization of a graph comparison function. In the first phase, the size and the position of the graph are optimized simultaneously; in the second phase, the intrinsic form of the graph is optimized.

It has, however, turned out that a successful recognition of a structure or of an object by means of this method depends to a very high extent on the quality—especially on the nature of the background—of the image data comprising the structure to be recognized. It is true that this method is suitable for achieving good results, when the structure and the object have been recorded in front of a neutral background, but in cases of use where it is not possible to record the image data in front of a neutral background, problems may arise in the case of the known method; these problems may, in the final analysis, result in an unsatisfactory recognition of structures and objects.

In the field of face recognition a further method is known in the case of which the comparison between the image of a head recorded with a video camera and a plurality of images of heads stored in a data base is realized by a flexible mapping mechanism, the optimum mapping being realized by an optimization method (cf. Lades et al., IEEE Transactions on Computers, 42, 300–311).

This method is, however, disadvantageous insofar as it does not seem to be suitable for processing large quantities of data. It is true that Lades et al. was able to recognize an image of a head from a data base which comprised images of 87 persons, but in many cases of use much larger reference data bases have to be reckoned with.

In addition, the method according to Lades et al. was only realized with a special hardware configuration, viz. with transputers, i.e. with a plurality of microprocessors which are interconnected in a predetermined manner.

In view of these disadvantages of the methods according to the prior art, it is the object of the present invention to improve the known methods in such a way that their robustness with respect to less optimum image data is increased in comparison with the known method, and to guarantee in addition that the method can be realized by conventional means.

DESCRIPTION OF THE INVENTION

The above-mentioned object is achieved by a method for automatically recognizing one or more structures in digitized image data, said method comprising the steps of:

(a) providing at least one reference graph comprising digitized reference image data of corresponding reference images, the reference graph or each reference graph comprising a net-like structure, the respective net-like structure being defined in that specific reference image data have assigned thereto nodes which are interconnected by links in a predetermined manner, and jets, each node having a jet assigned thereto and each jet comprising at least one sub-jet which is determined by convolutions of at least one class of filter functions with different magnitudes and/or orientations with the reference image data of the corresponding reference image at the specific node, or by convolutions of at least one class of filter functions with different magnitudes and/or orientations with colour-segmented reference image data of the corresponding reference image at the specific node, or by colour information on the reference image data at the specific node, or by texture descriptions of the corresponding reference image at the specific node, said texture descriptions being gained by statistical methods, or by motion vectors at the specific node, said motion vectors being extracted from successive reference images, (b) determining an optimum image graph from the digitized image data for each reference graph, said optimum image graph representing for a specific reference graph the optimum adaptation to said reference graph and being determined by projecting the net-like structure of said specific reference graph into the image data whereby the structure of the image graph is defined, and determining sub-jets of the image graph at the nodes defined by its structure, said sub-jets corresponding to at least part of the determined sub-jets of the specific reference graph, and the projection of the net-like structure of said specific reference graph being varied until a graph comparison function which compares the jets of the image graph with the corresponding jets of said specific reference graph becomes optimal, (c) associating the structure or each structure with the reference image corresponding to the reference graph for which the graph comparison function is optimal with respect to the optimal image graph determined for said reference graph.

By means of this method it is possible to utilize image information of different qualities simultaneously, such image information being e.g. convolutions of the class/classes of filter functions with arbitrary magnitudes and/or orientations with the image data and/or convolutions of the class/classes of filter functions with arbitrary magnitudes and/or orientations with colour-segmented image data and/or colour information on the image data and/or image-data texture descriptions gained by statistical methods and/or motion vectors extracted from successive images. This has the effect that, in comparison with the prior art, an improved structure recognition rate can be realized.

In addition, a higher robustness in comparison with the methods known from the prior art can be achieved by combining image information of different qualities.

According to a further development of the present invention a plurality of reference graphs can additionally be provided, and the reference graphs which have net-like structures that are topologically identical, i.e. which differ only with respect to the lengths of respective corresponding links, can be combined to form a reference bunch graph. Such a reference bunch graph comprises a net-like structure defined by nodes which correspond to the nodes of the reference graphs and by links which are determined by averaging the corresponding links of the reference graphs, and it further comprises bunch jets, each of said bunch jets being composed of the sub-jets corresponding to the jets at the respective nodes of the reference graphs combined in the reference bunch graph. In addition, an optimum image graph for the or for each reference bunch graph is determined according to this further development. Said optimum image graph represents for a specific reference bunch graph the optimum adaptation to said reference bunch graph and it is determined by projecting the net-like structure of said specific reference bunch graph into the image data whereby the structure of the image graph is defined, and by determining sub-jets corresponding to at least part of the sub-jets which have been used for determining the sub-jets of the reference graphs underlying the specific reference bunch graph. In addition, the projection of the net-like structure of said specific reference bunch graph is varied until a graph comparison function which compares the jets of the image graph with the corresponding bunch jets of said specific reference bunch graph becomes optimal, sub-jets of the image graph being compared with the sub-jets in the corresponding bunch jet of said specific reference bunch graph. Finally, each structure is associated with the reference image corresponding to the reference graph or to the reference graph from the reference bunch graph or graphs for which the graph comparison function is optimal with respect to the optimal image graph determined for said reference graph.

The use of reference bunch graphs permits, on the basis of the same number of reference images, an increase in the amount of structures which are available for the comparison or, in other words, a reference bunch graph permits the representation of a complex-structure object class with a small number of examples. In addition, the use of reference bunch graphs permits such structure object classes to be modelled by examples of individuals.

Depending on the respective case of use, i.e. on the structures to be recognized, only part of the reference graphs provided may be combined so as to form one or a plurality of reference bunch graphs. Special cases within one object class can be dealt with separately or left out of consideration in this way.

Alternatively, it is also possible to combine all the reference graphs provided so as to form one or a plurality of reference bunch graphs.

The above-described methods can be further developed in such a way that the structure of the jets associated with the nodes, which is determined by the sub-jets, depends on the respective node.

An a priori knowledge of the structures to be recognized can be utilized in this way. For example, specific image information can be evaluated only within a range in which it is actually significant. Furthermore, e.g. edge filters (cut-off filters) can be used at the edge of the structure.

Alternatively, the structure of the node-associated jets, which is determined by the sub-jets, can be identical for all nodes.

This further development is especially characterized in that it has a homogeneous data structure. Hence, the method can be realized by a comparatively simple hard- and/or software implementation.

In the above-described methods a graph comparison function can advantageously be used, said graph comparison function comprising a jet comparison function that takes into account the similarity of the jets corresponding to one another.

In addition, the graph comparison function can comprise a comparison function for the net-like structure, which takes into account the metric similarity of the image graph and the corresponding reference graph or the corresponding reference bunch graph. In this case, it will be expedient to define the graph comparison function as a weighted sum of the jet comparison function and of the comparison function for the net-like structure.

The jet comparison function can be defined as a function of single jet comparison functions of jets corresponding to one another.

For this purpose, the jet comparison function can advantageously be defined as a weighted sum of the single jet comparison functions and/or as a weighted product of the single jet comparison functions.

In accordance with an expedient embodiment, sub-jets of the corresponding jets can be taken into account for determining a single jet comparison, and a single jet comparison function can be defined as a function of sub-jet comparison functions.

In accordance with an advantageous embodiment, the single jet comparison function can be defined as weighted sum of the sub-jet comparison functions and/or as a weighted product of the sub-jet comparison functions.

In particular, it is also possible to use different node-dependent jet comparison functions and/or single jet comparison functions and/or sub-jet comparison functions.

In connection with the above-described reference bunch graphs, the bunch jets of the reference bunch graph $B^M$ can be divided into sub-bunch jets $j_n^M$, and the jet comparison function between the sub-bunch jets $j_n^M$ of the reference bunch graph and the corresponding sub-jets $j_n'$ of the image graph G' for n nodes for m recursions can be calculated according to the following formulae:

$$S_{Jet}(B^M, G') = \sum_n \omega_n S_n(B_n^M, J_n'), \text{ or}$$

$$S_{Jet}(B^M, G') = \prod_n (S_n(B_n^M, J_n'))^{\omega_n},$$

wherein $\omega_n$ is a weighting factor for the n-th node n, and the comparison function $S_n(B_n^M, J_n')$ for the n-th node of the reference bunch graph with the n-th node of the image graph is given by:

$$S(B^M, J') = \Omega(\{S_{kl}(b_k^M, j_l')\}) = :\Omega(M), \text{ with}$$

$$\Omega^{(0)}(M) = \sum_i \omega_i \Omega_i^{(1)}(M_i^{(1)}), \text{ or}$$

$$\Omega^{(0)}(M) = \prod_i (\Omega_i^{(1)}(M_i^{(1)}))^{\omega_i}, \text{ or}$$

$$\Omega^{(0)}(M) = \max_i \{\omega_i \Omega_i^{(1)}(M_i^{(1)})\}, \text{ or}$$

$$\Omega^{(0)}(M) = \min_i \{\omega_i \Omega_i^{(1)}(M_i^{(1)})\}, \text{ wherein } \bigcup_i M_i^{(1)} = M$$

...

$$\Omega_i^{(m-1)}(M_i^{(m-1)}) = \sum_j \omega_j \Omega_j^{(m)}(M_j^{(m)}), \text{ or}$$

$$\Omega_i^{(m-1)}(M_i^{(m-1)}) = \prod_j (\Omega_j^{(m)}(M_j^{(m)}))^{\omega_j}, \text{ or}$$

$$\Omega_i^{(m-1)}(M_i^{(m-1)}) = \max_j \{\omega_j \Omega_j^{(m)}(M_j^{(m)})\}, \text{ or}$$

$$\Omega_i^{(m-1)}(M_i^{(m-1)}) = \min_j \{\omega_j \Omega_j^{(m)}(M_j^{(m)})\}, \text{ wherein}$$

$$\bigcup_j M_j^{(m)} = M_i^{(m-1)} \text{ and with}$$

-continued $$S(b^M, j') = \sum_n \omega_n S_n(j_n^M, j'), \text{ or}$$

$$S(b^M, j') = \prod_n (S_n(j_n^M, j'))^{\omega_n}, \text{ or}$$

$$S(b^M, j') = \max_n \{\omega_n S_n(j_n^M, j')\}, \text{ or}$$

$$S(b^M, j') = \min_n \{\omega_n S_n(j_n^M, j')\}.$$

In this case, the sub-bunch jets of the reference bunch graph or graphs may comprise only features which have been determined by convolutions of at least one class of filter functions with different magnitudes and/or orientations with the reference image data of the corresponding reference image at the specific node, or by convolutions of at least one class of filter functions with different magnitudes and/or orientations with colour-segmented reference image data of the corresponding reference image at said specific node, or by colour information on the reference image data at said specific node, or by texture descriptions of the corresponding reference image at said specific node, said texture descriptions being gained with statistical methods, or by motion vectors at said specific node, said motion vectors being extracted from successive reference images.

Alternatively, the sub-bunch jets of the reference bunch graph or graphs may comprise only features which result from a reference graph.

In addition, the sub-bunch jets of the reference bunch graph or graphs may also comprise mixtures of these two above-mentioned features.

These different comparison functions permit a use-oriented optimization of the method in such a way that the highest possible recognition rate and the highest possible speed are achieved.

According to a preferred embodiment of the above-described method, a step can be provided according to which, after the recognition of each structure, the significance of the recognition is determined. For this purpose, an estimator can be used by way of example, said estimator taking into account the optimum graph comparison function as well as the non-optimum graph comparison function.

An estimator in the case of which the distance of the values of the non-optimum graph comparison functions from the value of the optimum graph comparison function is determined is particularly suitable for this purpose.

By means of these measures, object and structure recognition can be achieved and information on the quality of the structure recognition can be obtained as well.

According to another advantageous further development of the above-mentioned methods, each structure can be associated with the reference images corresponding to the reference graphs and/or the reference graphs from the reference bunch graphs for which the values of the graph comparison functions lie within a predetermined range. If the values do not lie within a predetermined range, this means that a structure cannot be identified sufficiently. Hence, this further development is suitable for cases of use where decisions are to be taken on the basis of the recognition process, e.g. in the case of access control.

According to an advantageous embodiment, the colour information used in the above-described methods may comprise hue values and/or colour saturation values and/or intensity values determined from the reference image data and the image data, respectively.

Although the reference graphs and the reference bunch graphs, respectively, can be recalculated prior to each application, which will be expedient in the cases of use where the reference data change frequently, especially due to updating, it will be expedient in most cases of use that the step of providing the reference graphs and the reference bunch graphs, respectively, comprises fetching the reference graphs and the reference bunch graphs from a central data base and/or a decentralized data base, e.g. from chip cards.

According to a preferred embodiment, the net-like structure of the reference graph can be used in the above-described methods in the form of a regular grid whose nodes and links define rectangular meshes.

Alternatively, an irregular grid can be used as a net-like structure of the reference graph, the nodes and links of said irregular grid being adapted to the structure to be recognized. The nodes can have associated therewith characteristic points, so-called landmarks, of the structure to be recognized.

It follows that, in the case of this further development, the jets are determined at the characteristic points of the structure. This means that, when the image data and the reference data are compared, the characteristic points are primarily taken into account, whereby the significance with which a structure is recognized can be increased.

According to a preferred embodiment, Gabor filter functions and/or Mallat filter functions can be used in the above-described methods as class of filter functions for convolution with the reference image data and image data, respectively, and/or as class of filter functions for convolution with the colour-segmented reference image data and image data, respectively.

According to a preferred embodiment of the above-described methods, the projection of the net-like structure of the specific reference graph and/or the specific reference bunch graph may comprises centering the reference graph and/or the specific reference bunch graph in the image.

In addition, it proved to be advantageous when the projection of the net-like structure of the specific reference graph and/or of the specific reference bunch graph comprises a displacement and/or rotation of the centered reference graph and of the centered reference bunch graph, respectively.

This will reduce the amount of time required for recognizing the structure.

In particular, the projection of the net-like structure of the specific reference graph and/or of the specific reference bunch graph may comprise scaling the centered reference graph and the centered reference bunch graph, respectively. This permits especially an increase in the significance and the speed of recognition, if the structure to be recognized differs in size in the image data and in the reference data.

The displacement and/or the rotation as well as the scaling of the centered reference graph and of the centered reference bunch graph, respectively, can in this case by carried out simultaneously, whereby the amount of time required for recognizing a structure can be reduced.

In addition, the projection of the net-like structure may comprise local distortions of the centered reference graph. This embodiment will be particularly suitable for cases where the image data and the reference data have been recorded at different recording angles.

It will be expedient to cause such a local distortion by a local displacement of a respective node of the centered reference graph.

In accordance with an advantageous embodiment, the displacement and/or the scaling and/or the rotation can be determined on the basis of a comparison between the image graph and the corresponding reference graph and/or the corresponding reference bunch graph. This will lead to a substantial increase in the recognition speed.

Further preferred embodiments result from the subclaims and from the description of preferred embodiments of the method according to the present invention, which will be described hereinbelow making reference to the drawing, in which:

In the following, the various embodiments of the present invention will be described on the basis of a method for recognizing the position of a hand, referred to as hand position hereinbelow. This description must, however, not be regarded as a restriction, but only as an example of a method for recognizing structures and objects, respectively, in images.

Figure 1:
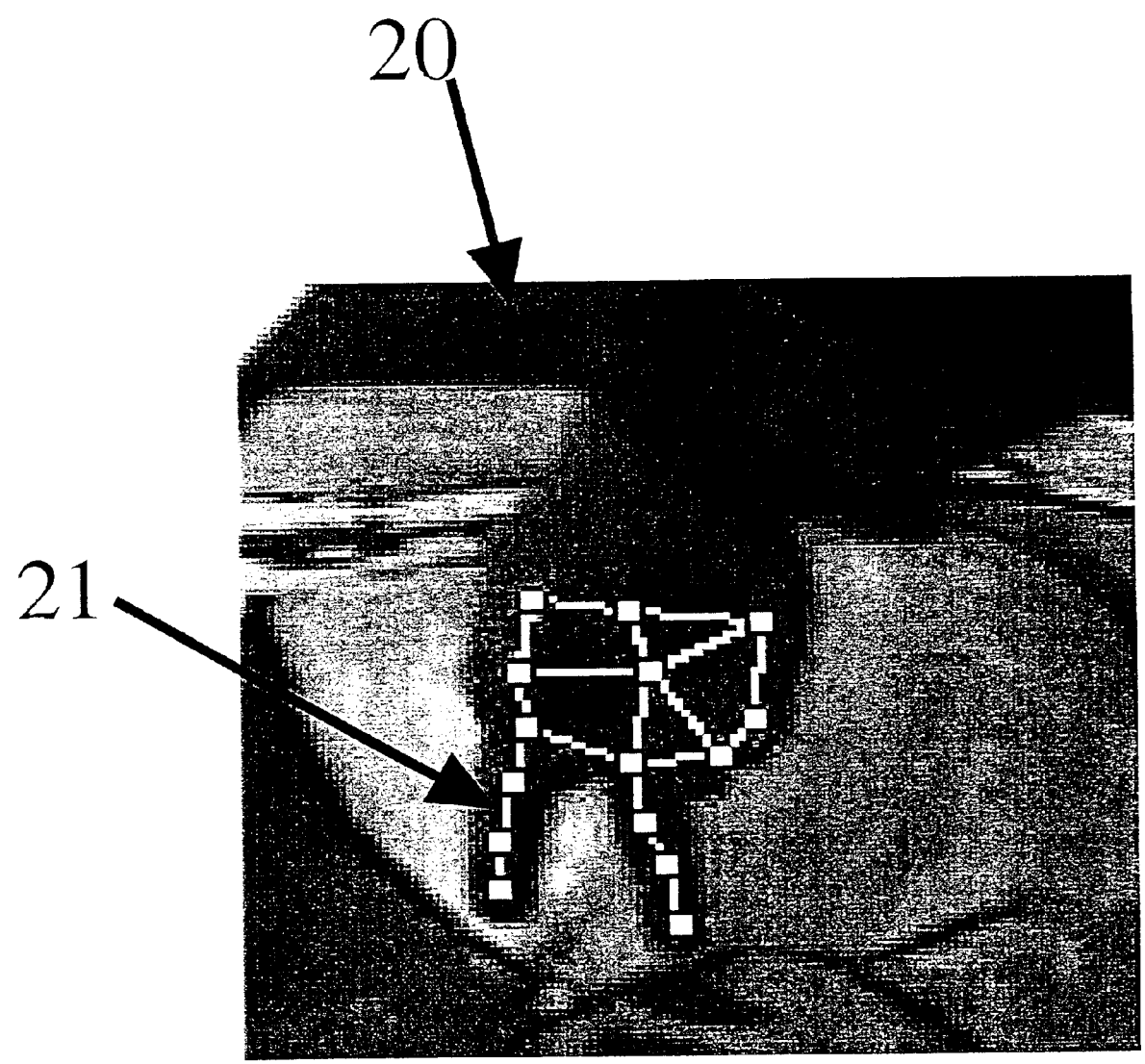
FIG. 1 shows an image of a hand position with a reference graph for explaining one embodiment of the present invention.

FIG. 1 shows, by way of example, an image 20 of a hand at a certain position.

For carrying out the method according to the present invention, the image 20 must exist in digitized form. The digitized form can either directly result from the recording technique in question, e.g. when a CCD camera is used, or it must be obtained by converting an analog picture, e.g. a conventional photo.

A digitized image exists typically in the form of a pixel field having a predetermined size. Each pixel has associated therewith a horizontal and a vertical position $\vec{x}$. Hence, pixel $\vec{x}$ stands hereinbelow for the pixel which has had associated therewith the position $\vec{x}$. In addition, each pixel has assigned thereto a grey value and/or a colour information value, such as an HSI value.

Local image information, so-called features, which are, in turn, combined to form so-called jets, is now extracted from the digitized image 20 and/or from the image data corresponding to said digitized image within the framework of the method according to the present invention. These extracted features are arranged in the form of a graph.

The predetermined pixels are obtained in that a net-like structure 21, which, for the sake of simplicity, will be referred to as grid in the following, is first projected into the image 20.

Figure 2:
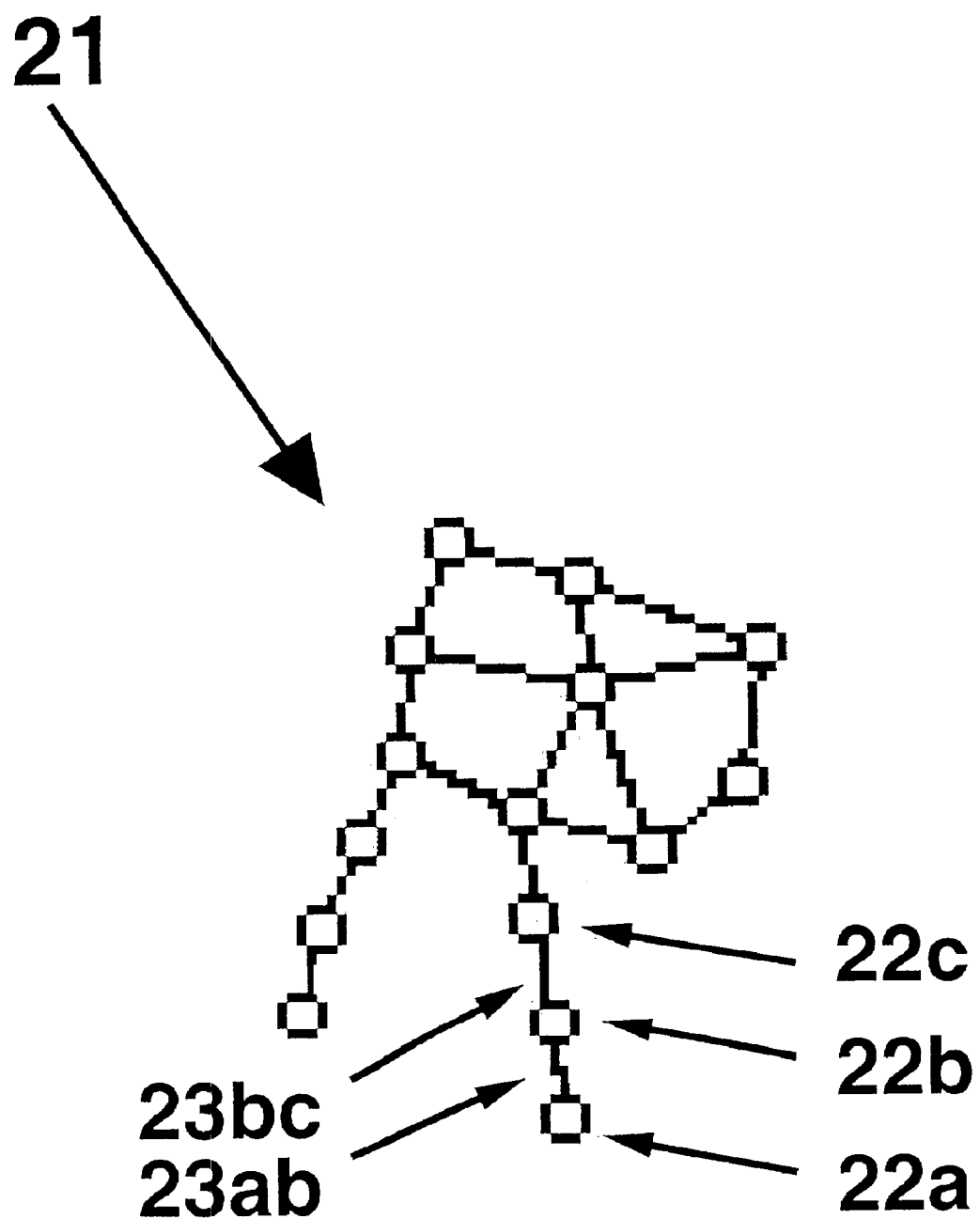
FIG. 2 shows the reference graph according to FIG. 1.

As can be seen from FIG. 2, in which this grid 21 is shown in detail, the grid used in the first embodiment comprises 15 nodes 22a, 22b, 22c, . . . and 19 links, i.e. connections between two respective nodes. In FIG. 2 the links between the nodes 22a and 22b, and 22b and 22c are designated by reference numerals 23ab and 23bc, respectively.

Finally, the predetermined pixels are obtained by determining the pixels corresponding to the projection of the nodes.

In the first embodiment an object-adapted grid is used, i.e. the nodes are associated with characteristic points in the image. For recognizing the position of a hand, the nodes are therefore assigned to the two fingers and the back of the hand, as can be seen in FIG. 1.

The present invention is, however, not limited to such object-adapted grids, but it is also possible to use grids in the actual sense of the word, i.e. regular grids. The decision which form of grid will be expedient, depends on the respective case of use. In comparison with regular grids, object-adapted grids will normally lead to a more significant recognition, but they are more difficult to handle.

Figure 3:
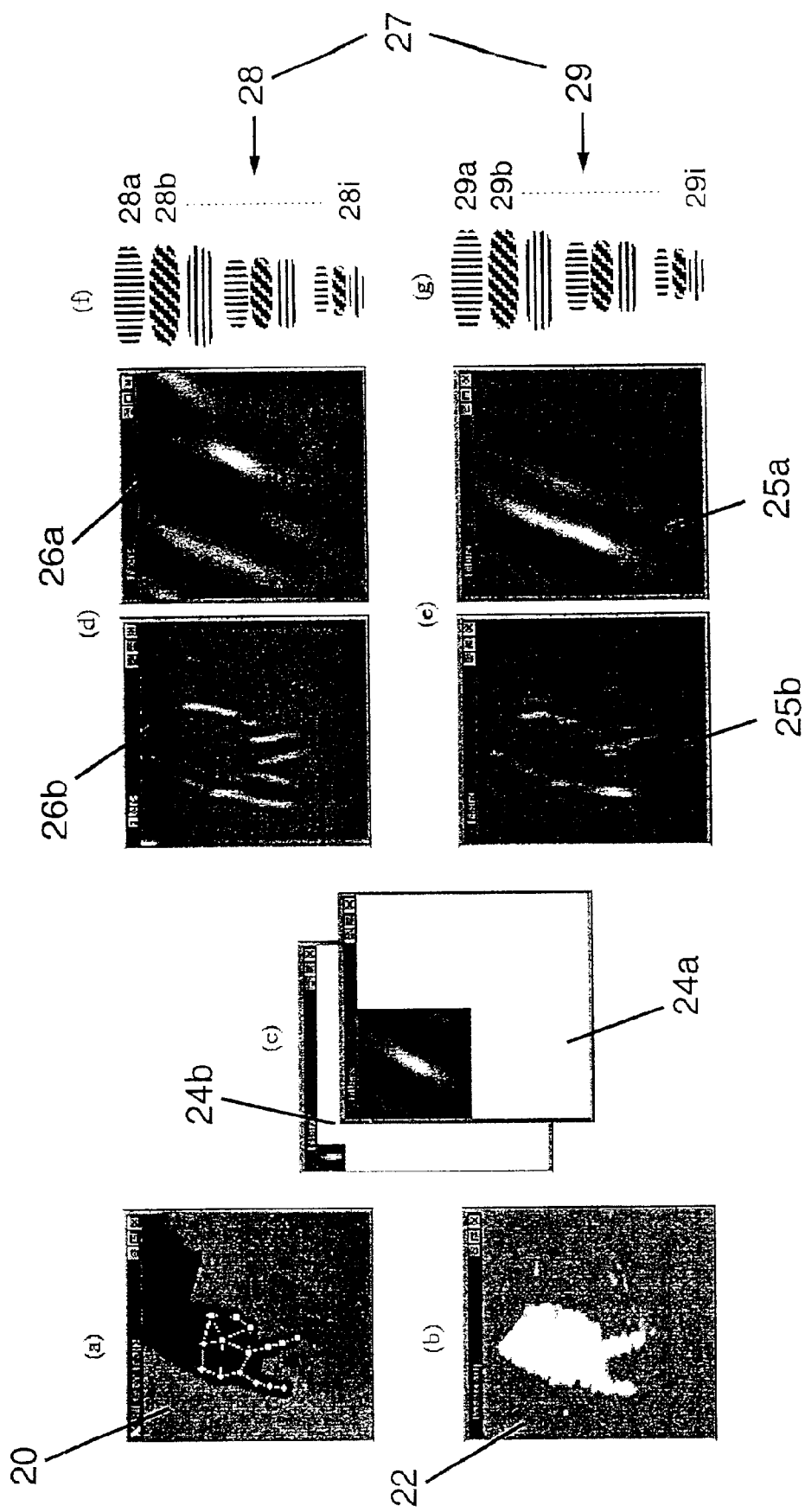
FIG. 3 shows a schematic representation for determining a graph from a reference image according to one embodiment of the present invention.

FIG. 3 shows a schematic representation on the basis of which it is explained how a representation in the form of a graph is obtained from image 20; as will be explained hereinbelow, this representation in the form of a graph can be compared with other graphs, in particular with reference graphs.

When specific pixels have been determined by the grid, as can be seen in FIG. 3(a), the features in these pixels are extracted as described hereinbelow.

In the first embodiment two different classes 28 and 29 of features are used for comparing the image with a reference image.

The first class of features 28a, . . . , 28i is defined as the result of a convolution of the image at a predetermined pixel with a given filter function.

According to the first embodiment, so-called complex Gabor filters are used as filter functions for this purpose. These filters can be represented by the following formula:

$$\psi_j(\vec{x}) = \frac{k_j^2}{\sigma^2}\exp\left(-\frac{k_j^2 x^2}{2\sigma^2}\right)\left[\exp(i\vec{k}_j \cdot \vec{x}) - \exp\left(-\frac{\sigma^2}{2}\right)\right]. \quad (1)$$

The Gabor filters represented by equation (1) have the form of a plane wave described by a wave vector $\vec{k}_j$ and limited by a Gaussian function having a width σ/k, wherein σ=2π. By selecting the wave vector $\vec{k}_j$ the magnitude and the orientation of the filter function can be determined.

In addition, the filter functions satisfy the condition:

$$\sum_{\vec{x}} \psi_i = 0. \quad (2)$$

In FIG. 3(c) the real parts of such two different filter functions are shown, cf. 24a and 24b. The value 0 is represented by a medium grey; positive values are brighter and negative values are darker. The filter function 24a shown in FIG. 3(c) has a low frequency and a small wave vector $\vec{k}_j$ with an orientation of approximately 60 degrees relative to the horizontal. The filter function 24b has a higher frequency and a larger wave vector $\vec{k}_j$ with an orientation of approx. 90 degrees relative to the horizontal.

It follows that for a predetermined wave vector $\vec{k}_j$, i.e. by selecting the magnitude and the orientation of the filter function, the feature $J_j(\vec{x})$ can be calculated at a predetermined pixel $\vec{x}$ by:

$$J_i(\vec{x}) = \sum_{\vec{x}'} |(\vec{x}')\psi_j(\vec{x} - \vec{x}'). \quad (3)$$

I ($\vec{x}$) stands for the intensity in this equation.

In dependence upon the wave vector $\vec{k}_j$, various features $J_j(\vec{x})$ can now be calculated for each pixel $\vec{x}$, said various features being combined in a sub-jet for the pixel $\vec{x}$ in the first embodiment.

In the images in FIG. 3(d), which are designated by 26a and 26b, respectively, the results of the convolutions of image 20 with the filter functions 24a and 24b are shown for all pixels $\vec{x}$.

When the wave vector $\vec{k}_j$ is represented by:

$$\vec{k}_j = \begin{pmatrix} k_v \cos\phi_\mu \\ k_v \sin\phi_\mu \end{pmatrix}, k_v = 2^{-\frac{v+2}{2}}\pi, \phi_\mu = \mu\frac{\pi}{8}, \qquad (4)$$

wherein $v$ is the magnitude index and $\mu$ is the orientation index of the filter function, the features for the indices $\mu \in \{0, \ldots, 7\}$ and $v \in \{0, \ldots, 4\}$ are combined in a sub-jet 28 of jet 27 in accordance with the first embodiment.

It follows that the sub-jet 28 for the pixel $\vec{x}$ comprises a total of n=40 features.

In FIG. 3 part of these features is schematically shown in the sub-jet 28. Features 28a, 28b and 28c were obtained by means of filter functions having a constant magnitude and, as can be seen from the hatching, different orientations. The same applies to features 28d, 28e and 28f as well as 28g, 28h and 28i. In comparison with features 28a, 28b and 28c, features 28d, 28e and 28f as well as 28g, 28h and 28i result from a convolution with a smaller filter function.

In addition to the above-described Gabor filter functions, arbitrary other filter functions can be used as well. According to a further embodiment of the present invention, so-called Mallat filters are used as a further example of a class of filter functions.

The convolution of the image with these Mallat filters can be expressed by the following formula:

$$T_{s_1}(\vec{x}) = \left| (\vec{x}) * \begin{pmatrix} \psi_{s_1}^{(h)}(\vec{x}) \\ \psi_{s_1}^{(v)}(\vec{x}) \end{pmatrix} \right|, \qquad (5)$$

wherein * stands for the convolution operation, h and v stand for horizontal and vertical, and $s_j$ ($s_j = s_o 2^j$, $j \in N$) represents the width of a Gaussian function whose derivatives are used as filter functions.

The second class of features 29a, ..., 29i is defined as the result of a convolution, at a predetermined pixel, of data with a given filter function, said data resulting from a conventional colour space segmentation of the image data. In the present case, the colour space segmentation was carried out with respect to the skin colour. It goes without saying that, depending on the respective case of use, the colour space segmentation can also be carried out with respect to other colours. In FIG. 3(b) the image data 22 are shown after the colour space segmentation.

In the present embodiment, the convolution of the colour space-segmented data was carried out analogously to the convolution of the image data, i.e. with the same Gabor filters of the same magnitude and orientation. Hence, a detailed description of this convolution operation can be dispensed with; in this connection, reference is made to the respective paragraphs dealing with the convolution of the image data with the Gabor filters.

It should, however, additionally be pointed out in this connection that in FIG. 3(e) the colour space-segmented image data folded with the filter functions are shown. The images 25a and 25b in FIG. 3(e) represent the real parts of a convolution of the colour-segmented image data with the filters whose real parts are designated by 24a and 24b in FIG. 3(c).

Analogously to the features resulting from the convolution of the image data with the Gabor filters, also the features obtained by folding the colour space-segmented image data with the Gabor filters are combined in a sub-jet 29. Since the magnitude index and the orientation index of the filter functions have been chosen in this embodiment as described above, the sub-jet 29 also comprises n=40 features for the pixel $\vec{x}$, the features 29a, ..., 29i being shown representatively.

It goes without saying that, instead of the Gabor filters, other filter functions, such as the Mallat filters which have already been mentioned, can be used in this case as well.

The sub-jets 28 and 29 define the jet 27 in the first embodiment. The jet 27 finally comprises 80 features in this embodiment.

When the extraction of the features is carried out at all points of the grid, the desired graph will finally be obtained, said graph reflecting the structure of the grid 21 and comprising the jets at the points corresponding to the grid points.

According to a further embodiment, colour information obtained from the image data, such as the hue, colour saturation and intensity (HSI), is used, instead of the convolutions of the filter functions with the colour-segmented data, as second class for the pixel. According to this embodiment, a single jet is therefore composed of 40 features resulting from the above-described convolution of the image data with the Gabor filter functions and of the HSI triple; hence, it comprises 43 features.

It will be expedient to used a weighted Euclidian distance in the HSI colour space as a comparison function between two HSI triples.

In addition, a jet is composed of three classes in the case of a further embodiment. The first class comprises the features resulting from the convolution of the image data with the Gabor filters (Gabor features); the second class comprises the features resulting from the convolution of the colour space-segmented image data with the Gabor filters (colour-gabor features); and the third class comprises the HSI triple obtained from the image data (colour information).

According to a further embodiment, a texture description gained by statistical methods can be used alternatively to or in addition to the above-described classes. Such texture descriptions are e.g. the medium grey value, the variance of the grey value distribution, the covariance matrix of the grey value distribution, the entropy, the orientation of the grey value structure, medium scales of the structure in various directions, the variation range of the local orientation, the variation range of the spatial scales, the sequence and the arrangement of various elements of the structure.

In addition, and again alternatively to or in addition to the above-described classes, motion vectors (displacement vectors) are defined as a class according to a further embodiment. Such motion vectors can be calculated from two successive images by means of differential geometric methods (differential methods), correlation methods and filter methods. Furthermore, it is also possible to calculate motion vectors from two Gabor jets.

In addition to the embodiments described in detail, a large number of combination possibilities of the above-described classes exist in dependence upon the field of use, i.e. the structure, the quality and the complexity of the content of the image data to be compared. It is especially also possible to use the features of only one of the above-described five classes for the comparison. In particular, it is also possible that features resulting from convolutions of the image data with a first filter class define the first class, and that features resulting from convolutions of the image data with a second filter class define the second class.

In the following it will be described how an image is compared with a reference image. The first word "comparison" in compound words refers to the respective image recorded in which the structure or the object is to be recognized.

To begin with, a reference image in the form of a graph, i.e. in the form of a reference graph, must be provided. This can be done e.g. by fetching the reference graph from a central data base or a decentralized data base, e.g. from chip cards.

When the data base is being created, this reference graph G is determined according to one of the above-described methods. In the present case, a grid of the type shown e.g. in FIG. 2 is therefore projected into the reference image. At the nodes of the grid, the jets are determined, as has already been explained hereinbefore as well. The jets of the reference graphs should comprise at least the classes of features which are to be determined for the comparison graph as well.

In the next step, the grid of the reference image (reference grid) is projected into the comparison image and the jets corresponding to this grid are calculated for the comparison image. In so doing, filter functions, i.e. the same class of filter functions, the same magnitudes and/or the same orientations, with which the reference graph has been created should be used at least partially. The thus calculated jets together with the structure of the projected grid will finally define the comparison graph G'.

In dependence upon the differences between the reference images and the comparison images to be expected, various mappings can be used for projecting the reference grid into the comparison image.

The simplest projection, viz. centering the reference grid in the comparison image, will e.g. be suitable for cases where the reference image and the comparison image have the same size and the same position with respect to the image centre and have been recorded at the same angle.

In addition to this simple projection, the following projections can be carried out selectively.

Displacement of the reference grid in its entirety:
this mapping will be suitable for cases where the reference image and the comparison image occupy different positions with respect to the image centre.

Scaling of the reference grid:
this mapping can be provided in cases where the reference image and the comparison image are different in size.

Rotation of the reference grid:
a rotation can be used in cases where the reference image and the comparison image are rotated relative to one another.

Local distortion of the reference grid:
in the case of this mapping individual points of the grid are displaced relative to their position in the reference grid. This mapping is particularly suitable for cases where it is to be expected that the comparison image shows local distortions in comparison with the reference image.

It goes without saying that arbitrary combinations of the above-described projections are possible as well.

The evaluation of the similarity of the two graphs is carried out by means of a graph comparison function of the following general form:

$$S = S_{Jet} + \lambda S_{Metrik}. \tag{6}$$

$S_{Jet}$ stands here for the jet comparison function, i.e. a suitable function which evaluates the similarity of the jets at corresponding points of the two graphs, and $S_{Metrik}$ stands for a suitable function which compares the similarity of the metrics of the two grids. $S_{Metrik}$ depends strongly on the projection used.

$\lambda$ ($\lambda \geq 0$) designates the weighting of the two comparison functions relative to one another. $\lambda$ can also be made equal to zero; this means that the similarity of the metrics of the graphs is not taken into account. This value will be particularly expedient in cases where only centering or displacement is chosen as projection or, in other words, where the topologies of the reference graph and the comparison graph are identical.

For calculating the jet comparison function $S_{Jet}$, it will first be necessary to calculate the comparison functions of the sub-jets for the respective classes k. In the case of the first embodiment, whose features result from a convolution of the image data and of the colour space-segmented data with Gabor filters, k would be equal to 2.

For evaluating the similarity of two corresponding sub-jets $j_k$ and $j_k'$ of the jets j and j' of the reference graph G and of the comparison graph G', respectively, a sub-jet comparison function is used, i.e. a function which depends on the amplitudes $a_j$ and $a_j'$ of the two sub-jets and which has the following form:

$$S_k^a(j_k, j_k') = \frac{\sum_j a_j a_j'}{\sqrt{\sum_j a_j^2 \sum_j a_j'^2}}. \tag{7}$$

The present invention is, however, not limited to this comparison function; it is also possible to use a phase-sensitive comparison function having e.g. the following form:

$$S_k^\phi(j_k, j_k') = \frac{\sum_j a_j a_j' \cos(\phi_j - \phi_j' - \vec{d} \cdot \vec{k}_j)}{\sqrt{\sum_j a_j^2 \sum_j a_j'^2}}, \tag{8}$$

wherein $\vec{k}_j$ is the wave vector of the respective Gabor filters and $\vec{d}$ is an estimated displacement vector which compensates fast phase shifts. $\vec{d}$ is determined in that $S_\phi$ is maximized in its Taylor development within a small square, which is centered in $\vec{d} = 0$. The term $\vec{d} \cdot \vec{k}_j$ with the estimated displacement vector $\vec{d}$ finally compensates fast phase shifts on the basis of small variations of the positions $\vec{x}$ and $\vec{x}'$ of the two jets compared with one another.

$a_j(\vec{x})$ and $\phi_j(\vec{x})$ result in this case from $J_j(\vec{x}) = a_j(\vec{x})\exp(i\phi_j(\vec{x}))$.

A single jet comparison function for the respective individual jets can be formed making use of the sub-jet comparison functions for the sub-jets corresponding to one another, i.e. for the features of a class:

$$S(J, J') = \Omega(\{S_k(j_k, j_k')\}). \tag{9}$$

Depending on the respective case of use, different functions Ω can be used, for example $$\Omega(\{S_k(j_k, j'_k)\}) = \sum_k \omega_k S_k(j_k, j'_k), \text{ or} \quad (10)$$

$$\Omega(\{S_k(j_k, j'_k)\}) = \prod_k (S_k(j_k, j'_k))^{\omega_k}, \text{ or} \quad (11)$$

$$\Omega(\{S_k(j_k, j'_k)\}) = \max_k \{\omega_k S_k(j_k, j'_k)\} \quad (12)$$

$$\Omega(\{S_k(j_k, j'_k)\}) = \min_k \{\omega_k S_k(j_k, j'_k)\} \quad (13)$$

$S_k(j_k,j_k')$ are here the sub-jet comparison functions which can be calculated according to equations (7) or (8); $\omega_k$ are weighting coefficients which describe the contribution of a single sub-jet to the single jet comparison function $S(j,j')$.

The jet comparison function $S_{Jet}$ for all the corresponding jets of a reference graph G and of a comparison graph G' is finally formed from the single jet comparison functions for the individual jets. For this purpose, different functions can be used, again in dependence upon the respective case of use. The comparison function for n jets can, for example, be formed according to:

$$S_{Jet}(G, G') = \sum_n \omega_n S_n(J_n, J'_n), \text{ or} \quad (14)$$

$$S_{Jet}(G, G') = \prod_n (S_n(J_n, J'_n))^{\omega_n}. \quad (15)$$

$S_n(J_n,J_n')$ are here the single jet comparison functions which can be calculated according to equations (10) to (13); $\omega_n$ are weighting coefficients which describe the contribution of a single jet to the jet comparison function $S_{Jet}$.

The magnitudes of the differential vectors of two corresponding links, i.e. of the connections between two corresponding nodes, can, for example, be added so as to obtain the function for comparing the metrics of the two graphs; hence, the following metric comparison function is obtained for graphs with E links, which are referred to as $\Delta\vec{x}_e$ and $\Delta\vec{x}_e'$, respectively:

$$S_{Metrik}(G, G') = \frac{1}{E}\sum_e (\Delta\vec{x}_e - \Delta\vec{x}'_e)^2. \quad (16)$$

Which of the comparison functions is used in detail and, in particular, what factor is chosen for λ depends essentially on the structure of the reference graphs and of the comparison graphs, i.e., in the final analysis, on the structure of the comparison images and of the reference images.

The selection of the suitable comparison function for a given structure of the comparison images and of the reference images can be determined by means of comparison tests with the comparison images and the reference images and does therefore not exceed the scope of the normal ability of a person skilled in the art.

The comparison graph can now be optimally adapted to the reference graph with the aid of the graph comparison function (6). For this purpose, the projection of the reference grid into the comparison image is varied until the graph comparison function assumes an optimum value (in the case of the above-described comparison functions this optimum value is a minimum).

It is, of course, also possible to compare several reference images with the comparison image.

These reference images may exist in the form of a data base. In this case it will, however, be necessary to calculate the reference graphs again for each comparison.

It will therefore be more expedient to provide the data base in the form of a reference graph data base from the very beginning, the reference grids with their respective jets being stored in said reference graph data base and being simply fetched therefrom. Such a reference graph data base is, however, not as flexible as a reference image data base, since it has to be recompiled for each change in the calculation of the jets.

For comparing the comparison image with an arbitrary number of reference images, the optimum adaptation to each reference image and the graph comparison function for this optimum adaptation are determined for the comparison image by means of the above-described method.

On the basis of a comparison between the respective graph comparison functions corresponding to the optimum adaptations of the reference images to the comparison image, the reference image which is most similar to the comparison image can be ascertained.

In addition, by evaluating the graph comparison functions for all reference images it will be possible to determine a measure of the significance of the respective similarity. According to the necessary degree of similarity, different definitions for a significant recognition can be used in this connection.

For example, the average $\overline{S}$ and the variance $\sigma_S$ can be formed from all the graph comparison functions for the non-optimum reference graphs. A significant similarity could be assumed if $$\frac{S_{opt} - \overline{S}}{\sigma_s} \geq s \text{ or} \quad (17)$$

$$\frac{S_{opt} - S_2}{\sigma_s} \geq s \quad (18)$$

is fulfilled, wherein s is fixed parameter chosen and wherein $S_2$ is the second smallest value of all graph comparison functions.

Figure 4:
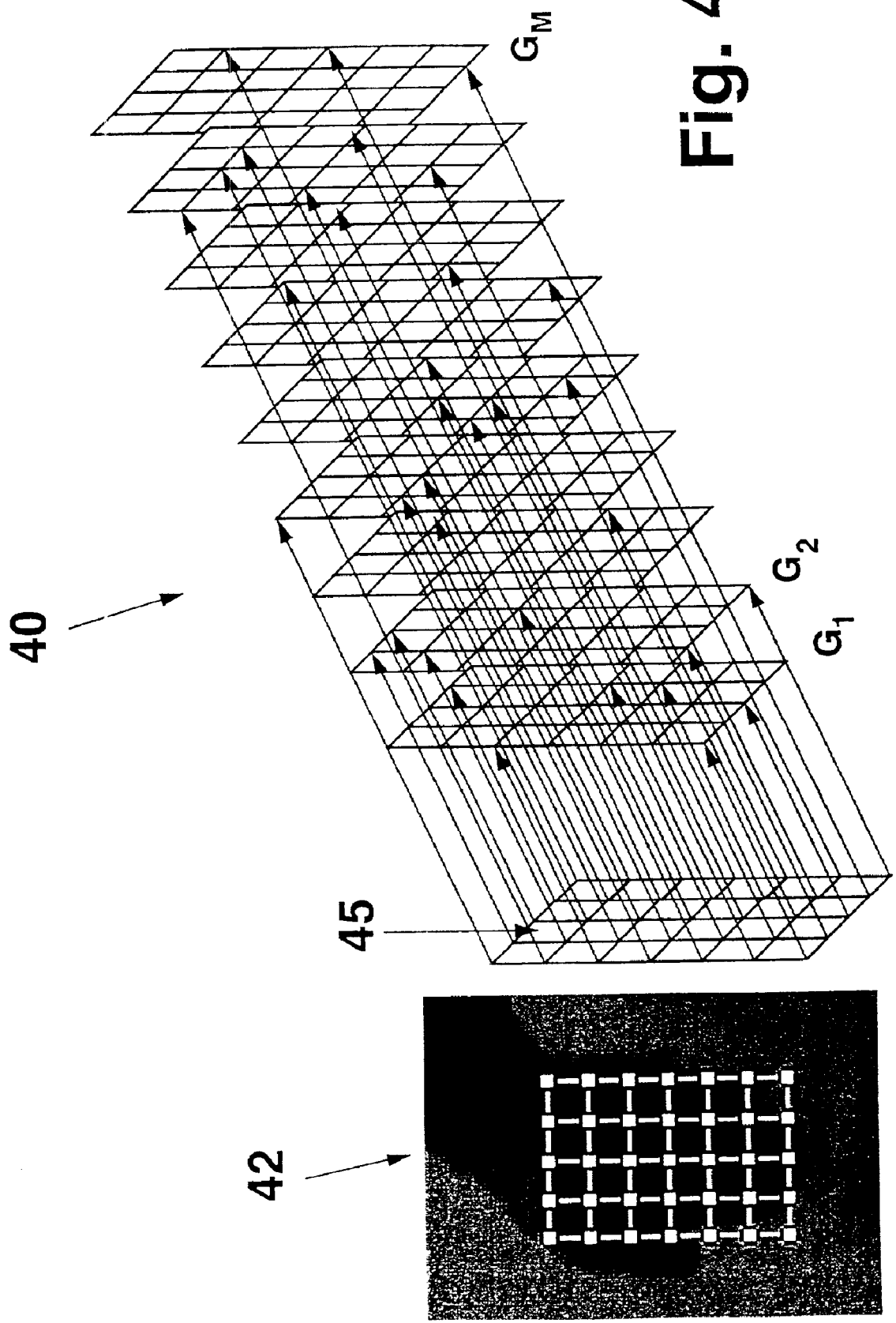
FIG. 4 shows a schematic embodiment for explaining a further embodiment of the present invention.

FIG. 4 shows a further embodiment of the present invention.

This embodiment differs from the hitherto described embodiments with respect to the structure of the reference graphs which are compared with the comparison graphs.

Whereas in the case of the hitherto described embodiments a reference graph has been created on the basis of a single reference image, a reference bunch graph results from a plurality of reference images in the case of this embodiment.

For this purpose, M model graphs are created on the basis of M images, said model graphs being combined in a so-called reference bunch graph.

All M model graphs have the same qualitative structure, i.e. they have N nodes which are linked by a predetermined grid. In this connection, it is, however, admissible that the lengths of two corresponding links are different. Hence, it is only demanded that the model graphs are topologically identical. The structure of the grid may have a regular form, as shown in the present connection, or an irregular form.

Hence, it is in particular possible to use the grids that have been used in the above-discussed embodiments, i.e. a regular n×m grid or an irregular object-adapted grid.

In addition to the lengths of two corresponding links that differ, also the corresponding jets of the M model graphs are different.

The M model graphs are finally combined so as to form a bunch graph, as will be explained hereinbelow.

To begin with, the mean distance vectors $\Delta_{ij}$ between the nodes i and j in each bunch graph are ascertained by:

$$\Delta_{ij} = \frac{1}{M} \sum_m \Delta_{ij}^m, \tag{19}$$

wherein $\Delta_{ij}^m$ is the distance vector between the nodes i and j in the model graph m.

These distance vectors now determine the structure of the bunch graph which is afterwards projected into the comparison image for the purpose of comparison.

The nodes of the bunch graphs have additionally assigned thereto bunch jets of the M model graphs. These bunch jets comprise all subsets which have been ascertained during the creation of the respective reference graphs. Hence, a jet of the bunch graph comprises the M corresponding jets of the M model graphs. In other words, a jet of the reference bunch graph is composed of the respective sub-jets corresponding to the sub-jets of the model graphs.

The resultant structure is schematically shown in FIG. 4. $G_1, \ldots, G_M$ designate here the M model graphs which are combined so as to form the bunch graph $B^M$ 40.

For carrying out the comparison the bunch jets are associated with sub-bunch jets. Criteria which can be used as association criteria are e.g. the feature classes, the reference images or mixed forms of these two. In the case of an association according to classes of features, the sub-bunch jets only comprise the features of a single class of features.

For comparing a bunch graph $B^M$ 40 obtained in this way with a comparison graph G' 45 resulting from an image 42, a bunch graph comparison function which is analogous to equation (6) is used according to this embodiment.

The jet comparison function $S_{Jet}$ is in this case determined in the way explained hereinbelow.

To begin with a comparison function between a sub-jet j' of the image and the corresponding sub-bunch jets $b^M$ is determined. For this purpose, the following equations, which are analogous to equations (10) to (13), can be used by way of example:

$$S(b^M, j') = \sum_n \omega_n S_n(j_n^M, j'), \text{ or} \tag{20}$$

$$S(b^M, j') = \prod_n (S_n(j_n^M, j'))^{\omega_n}, \text{ or} \tag{21}$$

$$S(b^M, j') = \max_n \{\omega_n S_n(j_n^M, j')\}, \text{ or} \tag{22}$$

$$S(b^M, j') = \min_n \{\omega_n S_n(j_n^M, j')\}. \tag{23}$$

j' is here a sub-jet of the image and $j_n^M$ is the corresponding sub-bunch jet; the $S_n(j_n^M, j')$ are determined e.g. according to equation (7) or (8).

A functional relation $\Omega$ exists between the comparisons of the sub-jets and the sub-bunch jets on the one hand and the comparison function for the jet J with the bunch graph $B^M$ on the other:

$$S(B^M, J') = \Omega(\{S_{jd}(b_k^M, j_j')\}) =: \Omega(M). \tag{24}$$

The function $\Omega$ can in this case be determined according to the following recursion:

$$\Omega^{(0)}(M) = \sum_i \omega_i \Omega_i^{(1)}(M_i^{(1)}), \text{ or} \tag{25}$$

$$\Omega^{(0)}(M) = \prod_i (\Omega_i^{(1)}(M_i^{(1)}))^{\omega_i}, \text{ or} \tag{26}$$

$$\Omega^{(0)}(M) = \max_i \{\omega_i \Omega_i^{(1)}(M_i^{(1)})\}, \text{ or} \tag{27}$$

$$\Omega^{(0)}(M) = \min_i \{\omega_i \Omega_i^{(1)}(M_i^{(1)})\}, \text{ wherein } \bigcup_i M_i^{(1)} = M, \text{ and} \tag{28}$$

...

$$\Omega_i^{(m-1)}(M_i^{(m-1)}) = \sum_j \omega_j \Omega_j^{(m)}(M_j^{(m)}), \text{ or} \tag{29}$$

$$\Omega_i^{(m-1)}(M_i^{(1)}) = \prod_j (\Omega_j^{(m)}(M_j^{(m)}))^{\omega_j}, \text{ or} \tag{30}$$

$$\Omega_i^{(m-1)}(M_i^{(m-1)}) = \max_j \{\omega_j^{(m)}(M_j^{(m)})\}, \text{ or} \tag{31}$$

$$\Omega_i^{(m-1)}(M_i^{(m-1)}) = \min_j \{\omega_j \Omega_j^{(m)}(M_j^{(m)})\}, \text{ wherein} \tag{32}$$

$$\bigcup_j M_j^{(m)} = M_i^{(m-1)}.$$

Depending on the respective case of use, the recursion can be carried out until the following condition is fulfilled for $M^{(m)}$:

$$|M^{(m)}| = 1.$$

Making use of the comparison functions for the jet J with the bunch graph $B^M$ for the individual jets, the jet comparison function $S_{Jet}$ for all the corresponding jets of a reference bunch graph $B^M$ and of a comparison graph G' is finally formed. For this purpose, various functions can be used, again in dependence upon the respective case of use. The comparison function for n nodes can, for example, be formed according to:

$$S_{Jet}(B^M, G') = \sum_n \omega_n S_n(B_n^M, J_n'), \text{ or} \tag{33}$$

$$S_{Jet}(B^M, G') = \prod_n (S_n(B_n^M, J_n'))^{\omega_n}. \tag{34}$$

This comparison function can finally be inserted in equation (6) for determining the graph comparison function.

Expressed in words, the jets having the maximum similarity are selected from the bunch graph $B^M$, when said bunch graph $B^M$ is compared with a comparison graph G.

In FIG. 4 this fact is expressed by arrows which extend from the respective node of the comparison graph G and which end at different model graphs.

In addition to the above-mentioned bunch graph comparison function also other suitable comparison functions can be used.

When a bunch graph is used, this bunch graph will, just as in the case of a comparison with a single reference graph, first be projected into the image of the comparison graph and, subsequently, the optimum projection will be determined by evaluating the bunch graph comparison function.

Since a bunch graph can be treated like a single graph, it is also possible to combine a plurality of reference bunch graphs, one reference bunch graph and one or a plurality of reference graphs in a data base with which the comparison graphs are to be compared.

Making reference to FIG. 4 and FIG. 5, a concrete example of hand position recognition in front of a complex background according to the above-described method will be described in the following, said method making use of features which result from a convolution of the image data with Gabor filters (Gabor features), from a convolution of colour-segmented image data with Gabor filters (colour-gabor features) and from the HSI information (HSI features). This example is compared with a recognition method in the case of which only a single class is taken into account, i.e. the respective weighting coefficients $\omega_K$ are equal to zero.

Figure 5:
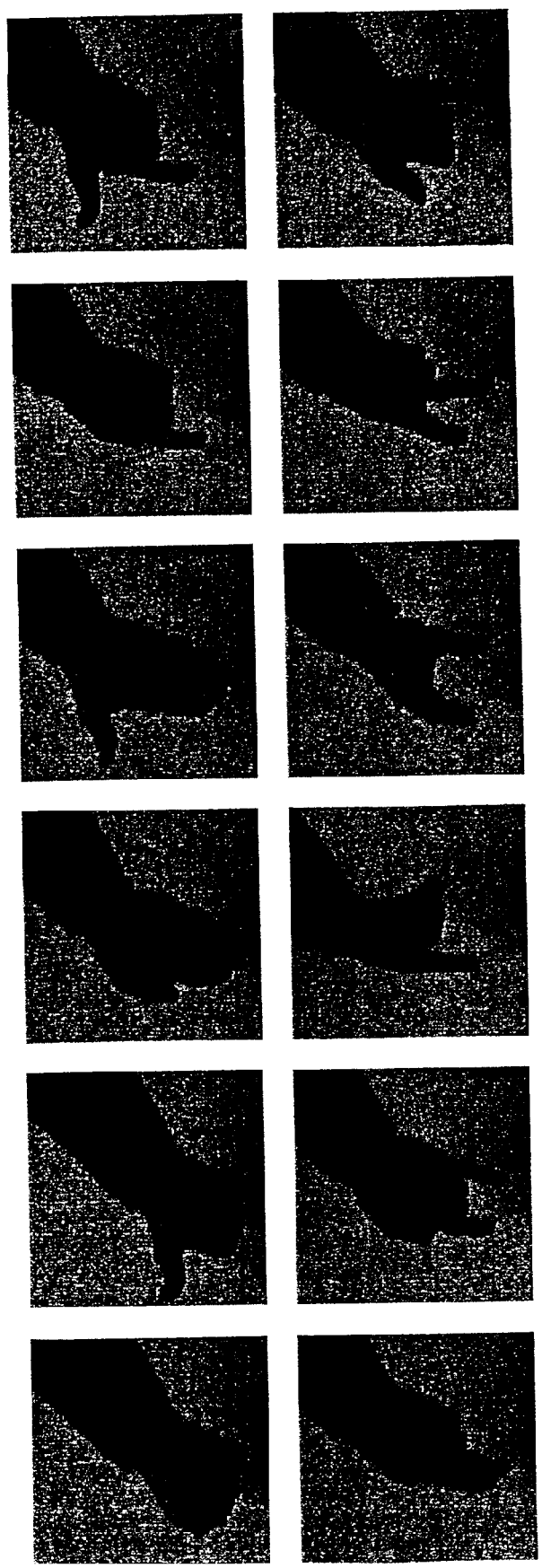
FIG. 5 shows images of hand positions from which a reference data base has been ascertained.

In FIG. 5 the representative reference images are shown, which have been used for creating reference graphs according to the above-described method. Each reference graph comprises 15 nodes and 20 links or connections. The nodes were manually distributed at anatomically significant points.

Figure 6:
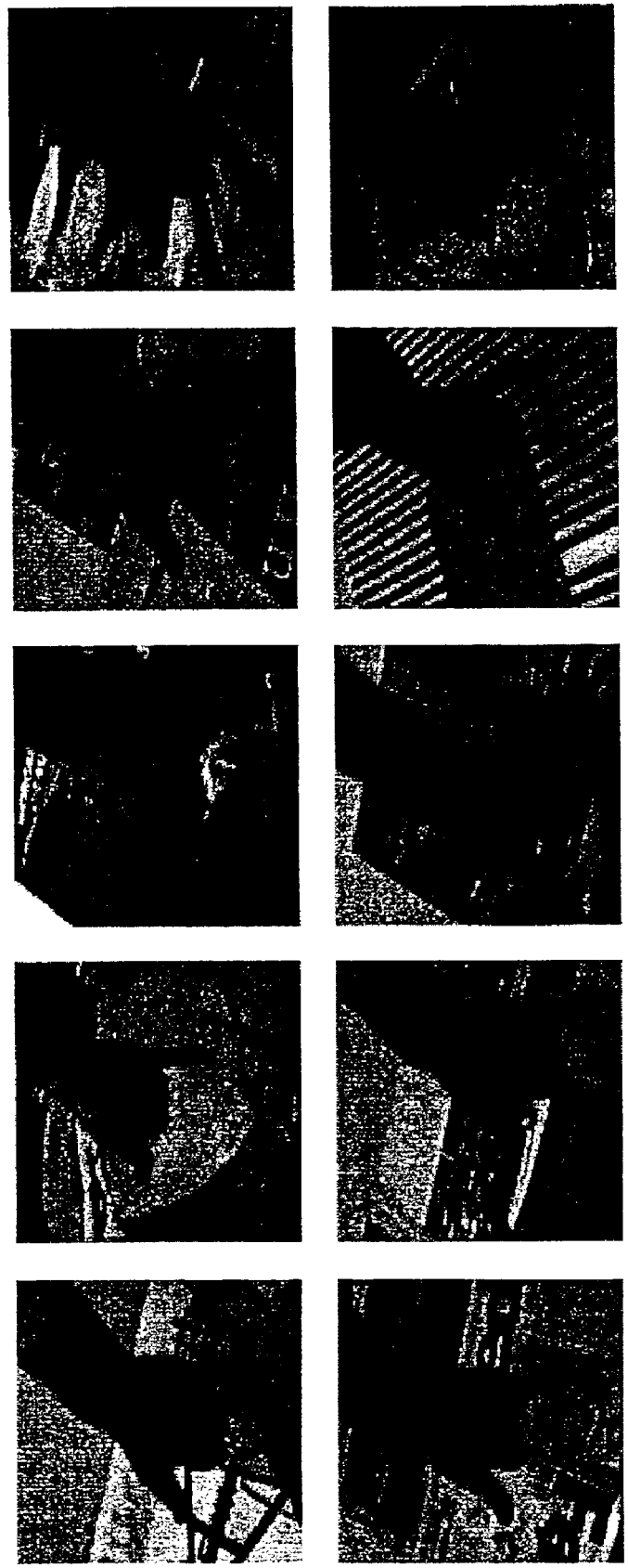
FIG. 6 shows examples of images of a hand position with different backgrounds which were compared with the images of FIG. 4 by means of one embodiment of the present invention.

In FIG. 6 various examples of a hand position in front of different backgrounds are shown. In total, 29 backgrounds have been used, among which five contained a high degree of skin colour, eleven a medium degree of skin colour and eight a small degree of skin colour.

Making use of these backgrounds, 1000 different comparison graphs have been created.

From the reference data, 18 reference graphs which contained Gabor features or colour-gabor features or HSI information were determined for each of the hand positions shown in FIG. 5. Gabor filters with three different magnitudes and eight different directions were used for the convolution.

From the respective 18 reference graphs three bunch graphs, each comprising 6 models, were formed. The features of the sub-jets were used as a criterion for the association of the sub-jets with the reference graphs. Accordingly, the first reference bunch graph contained all Gabor features, the second reference bunch graph contained all colour-gabor features and the third reference bunch graph contained all HSI features.

Upon projecting the reference bunch graphs, a rotation of up to 15°, a scaling of up to 20% and a local distortion by at most one pixel were admitted.

The graph comparison function was calculated by means of the equations (6;$\lambda$=0), (33; with identical $\omega_n$), (24), (25; with $\omega_{Gabor}$=0,25, $\omega_{colour\ Gabor}$=0.25, $\omega_{HSI}$=0.5), (33; with identical $\omega_n$), (8) for the Gabor and colour-gabor features and a weighted Euclidian distance for the HSI colour information.

The results of the comparison of the 1000 comparison images are summarized in the following table:

| weighting | simple background | complex background |
|---|---|---|
| only Gabor features | 82.6% | 70.4% |
| only colour-gabor features | 39.7% | 34.6% |
| only HSI features | 88.2% | 76.3% |
| optimum weighting | 92.9% | 85.8% |

What is claimed is:

1. A method for automatically recognizing one or more structures in digitized image data, comprising the following steps:
   providing at least one reference graph comprising digitized reference image data of corresponding reference images, the reference graph or each reference graph comprising:
      a net-like structure, the respective net-like structure being defined in that specific reference image data have assigned thereto nodes which are interconnected by links in a predetermined manner, and
      jets, each node having a jet assigned thereto and each jet comprising at least one sub-jet which is determined by convolutions of at least one class of filter functions with different magnitudes and/or orientations with the reference image data of the corresponding reference image at the specific node, or by convolutions of at least one class of filter functions with different magnitudes and/or orientations with colour-segmented reference image data of the corresponding reference image at the specific node, or by colour information on the reference image data at said specific node, or by texture descriptions of the corresponding reference image at the specific node, said texture descriptions being gained by statistical methods, or by motion vectors at the specific node, said motion vectors being extracted from successive reference images,
   determining an optimum image graph from the digitized image data for each reference graph, said optimum image graph representing for a specific reference graph the optimum adaptation to said reference graph and being determined by:
      projecting the net-like structure of said specific reference graph into the image data whereby the structure of the image graph is defined, and
      determining sub-jets of the image graph at the nodes defined by its structure, said sub-jets corresponding to at least part of the determined sub-jets of the specific reference graph, and
      the projection of the net-like structure of said specific reference graph being varied until a graph comparison function which compares the jets of the image graph with the corresponding jets of said specific reference graph becomes optimal,
   associating the structure or each structure with the reference image corresponding to the reference graph for which the graph comparison function is optimal with respect to the optimal image graph determined for said reference graph.

2. The method according to claim 1, wherein in addition a plurality of reference graphs is provided, and
the reference graphs, which have net-like structures that are topologically identical, are combined to form a reference bunch graph, said reference bunch graph comprising:
   a net-like structure defined by nodes which correspond to the nodes of the reference graphs and by links which are determined by averaging the corresponding links of the reference graphs, and
   bunch jets, each of said bunch jets being composed of the sub-jets corresponding to the sub-jets at the respective nodes of the reference graphs combined in the reference bunch graph; and
an optimum image graph is determined for the or for each reference bunch graph, said optimum image graph representing for a specific reference bunch graph the optimum adaptation to said reference bunch graph and being determined by:
   projecting the net-like structure of said specific reference bunch graph into the image data whereby the structure of the image graph is defined, and
   determining sub-jets corresponding to at least part of the sub-jets which have been used for determining the sub-jets of the reference graphs underlying the specific reference bunch graph, and the projection of the net-like structure of said specific reference bunch graph being varied until a graph comparison function which compares the jets of the image graph with the corresponding bunch jets of said specific reference bunch graph becomes optimal, each sub-jet of the image graph being compared with the sub-jets in the corresponding bunch jet of said specific reference bunch graph;

and wherein finally each structure is associated with the reference image corresponding to the reference graph or to the reference graph from the reference bunch graph or graphs for which the graph comparison function is optimal with respect to the optimal image graph determined for said reference graph.

3. The method according to claim 2, wherein only part of the reference graphs provided are combined so as to form one or a plurality of reference bunch graphs.

4. The method according to claim 2, wherein all the reference graphs provided are combined so as to form one or a plurality of reference bunch graphs.

5. The method according to one of the preceding claims, wherein the structure of the node-associated jets, which is determined by the sub-jets, depends on the respective node.

6. The method according to one of the claims 1 to 4, wherein the structure of the node-associated jets, which is determined by the sub-jets, is identical for all nodes.

7. The method according to one of the preceding claims, wherein a graph comparison function is used, which comprises a jet comparison function that takes into account the similarity of the jets corresponding to one another.

8. The method according to claim 7, wherein the graph comparison function additionally comprises a comparison function for the net-like structure, which takes into account the metric similarity of the image graph and the corresponding reference graph or the corresponding reference bunch graph.

9. The method according to claim 8, wherein the graph comparison function is defined as a weighted sum of the jet comparison function and of the comparison function for the net-like structure.

10. The method according to one of the claims 7 to 9, wherein the jet comparison function is defined as a function of single jet comparison functions of jets corresponding to one another.

11. The method according to claim 10, wherein the jet comparison function is defined as a weighted sum of the single jet comparison functions and/or as a weighted product of the single jet comparison functions.

12. The method according to claim 10 or 11, wherein sub-jets of the corresponding jets are taken into account for determining a single jet comparison, and wherein a single jet comparison function is defined as a function of sub-jet comparison functions.

13. The method according to claim 12, wherein the single jet comparison functions are defined as weighted sum of the sub-jet comparison functions and/or as a weighted product of the sub-jet comparison functions and/or as extremum of the sub-jet comparison functions.

14. The method according to one of the claims 7 to 13, wherein different node-dependent jet comparison functions and/or single jet comparison functions and/or sub-jet comparison functions are used.

15. The method according to one of the claims 7 to 9 in combination with claim 2, wherein the bunch jets of the reference bunch graph $B^M$ are divided into sub-bunch jets $b_k^M$, and the jet comparison function between the sub-bunch jets $b_k^M$ of the reference bunch graph and the corresponding sub-jets $j_j'$ of the image graph G' for n nodes for m recursions is calculated according to the following formulae:

$$S_{Jet}(B^M, G') = \sum_n \omega_n S_n(B_n^M, J_n'), \text{ or}$$

$$S_{Jet}(B^M, G') = \prod_n (S_n(B_n^M, J_n'))^{\omega_n},$$

wherein $\omega_n$ is a weighting factor for the n-th node n, and the comparison function $S_n(B_n^M, J_n')$ for the n-th node of the reference bunch graph with the n-th node of the image graph is given by:

$$S(B^M, J') = \Omega(\{S_{kl}(b_k^M, j_l')\}) = :\Omega(M), \text{ with}$$

$$\Omega^{(0)}(M) = \sum_i \omega_i \Omega_i^{(1)}(M_i^{(1)}), \text{ or}$$

$$\Omega^{(0)}(M) = \prod_i (\Omega_i^{(1)}(M_i^{(1)}))^{\omega_i}, \text{ or}$$

$$\Omega^{(0)}(M) = \max_i \{\omega_i \Omega_i^{(1)}(M_i^{(1)})\}, \text{ or}$$

$$\Omega^{(0)}(M) = \min_i \{\omega_i \Omega_i^{(1)}(M_i^{(1)})\}, \text{ wherein } \bigcup_i M_i^{(1)} = M$$

...

$$\Omega_i^{(m-1)}(M_i^{(m-1)}) = \sum_j \omega_j \Omega_j^{(m)}(M_j^{(m)}), \text{ or}$$

$$\Omega_i^{(m-1)}(M_i^{(1)}) = \prod_j (\Omega_j^{(m)}(M_j^{(m)}))^{\omega_j}, \text{ or}$$

$$\Omega_i^{(m-1)}(M_i^{(m-1)}) = \max_j \{\omega_j^{(m)}(M_j^{(m)})\}, \text{ or}$$

$$\Omega_i^{(m-1)}(M_i^{(m-1)}) = \min_j \{\omega_j \Omega_j^{(m)}(M_j^{(m)})\}, \text{ wherein}$$

$$\bigcup_j M_j^{(m)} = M_i^{(m-1)} \text{ and with}$$

$$S(b^M, j') = \sum_n \omega_n S_n(j_n^M, j'), \text{ or}$$

$$S(b^M, j') = \prod_n (S_n(j_n^M, j'))^{\omega_n}, \text{ or}$$

$$S(b^M, j') = \max_n \{\omega_n S_n(j_n^M, j')\}, \text{ or}$$

$$S(b^M, j') = \min_n \{\omega_n S_n(j_n^M, j')\}.$$

16. The method according to claim 15, wherein the sub-bunch jets of the reference bunch graph or graphs comprise only features which have been determined by convolutions of at least one class of filter functions with different magnitudes and/or orientations with the reference image data of the corresponding reference image at the specific node, or by convolutions of at least one class of filter functions with different magnitudes and/or orientations with colour-segmented reference image data of the corresponding reference image at said specific node, or by colour information on the reference image data at said specific node, or by texture descriptions of the corresponding reference image at said specific node, said texture descriptions being gained with statistical methods, or by motion vectors at said specific node, said motion vectors being extracted from successive reference images.

17. The method according to claim 15, wherein the sub-bunch jets of the reference bunch graph or graphs comprise only features which result from a reference graph.

18. The method according to one of the preceding claims, wherein, after the recognition of each structure, a step for determining the significance of the recognition is provided.

19. The method according to claim 18, wherein an estimator is used for determining the significance, said estimator taking into account the optimum graph comparison function as well as the non-optimum graph comparison function.

20. The method according to claim 19, wherein the distance of the values of the non-optimum graph comparison functions from the value of the optimum graph comparison function is used as an estimator.

21. The method according to one of the preceding claims, wherein, in addition, each structure is associated with the reference images corresponding to the reference graphs and/or the reference graphs from the reference bunch graphs for which the values of the graph comparison functions lie within a predetermined range.

22. The method according to one of the preceding claims, wherein the colour information comprises hue values and/or colour saturation values and/or intensity values determined from the reference image data and the image data, respectively.

23. The method according to one of the claims 1 to 22, wherein the step of providing the reference graphs and the reference bunch graphs, respectively, comprises fetching the reference graphs and the reference bunch graphs from a central and/or decentralized data base.

24. The method according to one of the preceding claims, wherein a regular grid is used as a net-like structure of the reference graph, the nodes and links of said regular grid defining rectangular meshes.

25. The method according to one of the claims 1 to 23, wherein an irregular grid is used as a net-like structure of the reference graph, the nodes and links of said irregular grid being adapted to the structure to be recognized.

26. The method according to claim 25, wherein the nodes are associated with characteristic points, so-called landmarks, of the structure to be recognized.

27. The method according to one of the preceding claims, wherein Gabor filter functions and/or Mallat filter functions are used as class of filter functions for convolution with the reference image data and image data, respectively.

28. The method according to one of the preceding claims, wherein Gabor filter functions and/or Mallat filter functions are used as class of filter functions for convolution with the colour-segmented reference image data and image data, respectively.

29. The method according to one of the preceding claims, wherein the projection of the net-like structure of the specific reference graph and/or the specific reference bunch graph comprises centering the reference graph and/or the specific reference bunch graph in the image.

30. The method according to claim 29, wherein the projection of the net-like structure of the specific reference graph and/or of the specific reference bunch graph comprises a displacement and/or rotation of the centered reference graph and of the centered reference bunch graph, respectively.

31. The method according to claim 29 or 30, wherein the projection of the net-like structure of the specific reference graph and/or of the specific reference bunch graph comprises scaling the centered reference graph and the centered reference bunch graph, respectively.

32. The method according to claim 31 in combination with claim 30, wherein the displacement and the scaling and the rotation of the centered reference graph and of the centered reference bunch graph, respectively, are carried out simultaneously.

33. The method according to one of the claim 30, wherein the displacement and/or the scaling and/or the rotation are determined on the basis of a comparison between the image graph and the corresponding reference graph and/or the corresponding reference bunch graph.

34. The method according to one of the claims 29 to 32, wherein the projection of the net-like structure comprises local distortions of the centered reference graph.

35. The method according to claim 34, wherein a local distortion is caused by locally displacing a respective node of the centered reference graph.

* * * * *

UNITED STATES PATENT AND TRADEMARK OFFICE
CERTIFICATE OF CORRECTION

PATENT NO. : 7,113,641 B1 Page 1 of 1
APPLICATION NO. : 09/762806
DATED : September 26, 2006
INVENTOR(S) : Christian Eckes et al.

It is certified that error appears in the above-identified patent and that said Letters Patent is hereby corrected as shown below:

Title Page item 76

Inventors,
change "Goetiestrasse 33, 61462 Koenigstein" to --Goethestrasse, 33 61462 Königstein--

Inventors,
change "Chrstoph Von Der Malsburg" to --Christoph von der Malsberg--

Inventors,
change "Velestrasse" to --Velsstrasse--

Signed and Sealed this

Twenty-second Day of July, 2008

JON W. DUDAS
*Director of the United States Patent and Trademark Office*